FIG. 7a (BEFORE CONTACT)

FIG. 7b (AT CONTACT)

FIG. 7c (EQUILIBRIUM ESTABLISHED)

Feb. 20, 1973  P. W. CHAPMAN  3,717,799
KTaO₃ ULTRAVIOLET DETECTOR
Filed Feb. 19, 1971  7 Sheets-Sheet 5

INVENTOR.
PAUL W. CHAPMAN
BY
*Osmund R. Dahl*
ATTORNEY.

United States Patent Office
3,717,799
Patented Feb. 20, 1973

3,717,799
KTaO₃ ULTRAVIOLET DETECTOR
Paul W. Chapman, Burnsville, Minn., assignor to
Honeywell Inc., Minneapolis, Minn.
Filed Feb. 19, 1971, Ser. No. 116,844
Int. Cl. H01l 15/00, 15/02
U.S. Cl. 317—234 R          13 Claims

ABSTRACT OF THE DISCLOSURE

Solid state photo-conductive and photo-voltaic ultraviolet detectors having a peak response at about 2600 to 2800 A. are formed from a body of potassium tantalate ($KTaO_3$) having an "as-grown" surface and first and second metal contacts attached to the as-grown surface, forming surface barrier junctions. The radiation which is detected is incident upon the as-grown surface.

BACKGROUND OF THE INVENTION

Ultraviolet detectors have found application in systems which monitor ultraviolet radiation levels for eye safety, ultraviolet radiometers for terrestial and space application and systems which utilize ultraviolet absorption of certain vapors as a means for vapor detection. However, one of the most important applications for ultraviolet detectors at the present time is in the general area of flame detection.

The most reliable and universal method of monitoring the presence or absence of a flame is to detect the ultraviolet radiation emitted by the flame. A first advantage of an optical detection method for flame sensing over the more conventional methods using thermal sensors such as thermocouples or thermistors is that optical sensors have response times of a few milli-seconds or less, where thermal detectors have response times of the order of seconds. Second, an optical sensor can be placed at a remote location where it is not subject to high temperatures or corrosion. Third, an optical sensor can detect flames anywhere within the field of view of the detector and over large distances, so that it is not necessary to know the exact position of the anticipated flame. This feature is important in fire detection and tracking systems. Ultraviolet detection for flame sensing is preferable over detection in the infrared portion of the spectrum because an infrared detector cannot distinguish between a flame and a hot body. Detection in the visible portion is undesirable because both sunlight and artificial ambient light cause the detector to respond. In addition, the intensity of black body radiation falls off exponentially from the visible to the ultraviolet range. In contrast to infrared and visible radiation, the ultraviolet emission of a flame gives a unique signature which can be rapidly detected by a suitable sensor.

Figure 1:
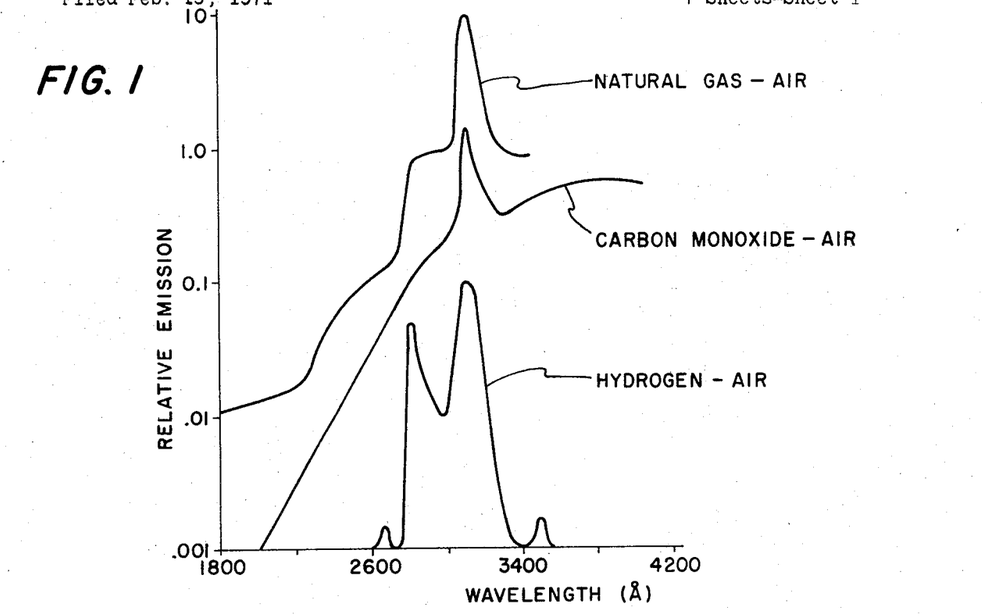
FIG. 1 shows relative emission as a function of wavelength for several types of flames.

Referring to FIG. 1, the emission spectra of several different flames is shown. While the exact spectrum for each flame is dependent upon the exact conditions present, such as fuel to air mixture, it can be seen that strong emission peaks for each of the flames occurs at approximately 3100 A. and the relative intensity of each decreases rapidly with decreasing wavelength for wavelengths below 2800 A.

The ultraviolet radiation observed is generated in the reaction zone of the flame and is a result of electronic molecular transitions and is not of a thermal character. Therefore its spectral intensity can be much higher than the spectral intensity corresponding to the thermal radiation of a black body heated to flame temperature. The ultraviolet radiation is associated with the rearrangement of electronic molecular orbitals during reaction. It thus derives its energy directly from certain chemical reactions and is therefore termed chemiluminescent. The dominant emission shown by the flames in FIG. 1 at 3060 A. and at 2810 A, is due to the excited states of the OH molecule. Flame spectra become more complex as more atomic species such as the halogens and metals are added to the reaction. However, the mechanisms for generating molecular ultraviolet radiation remain very similar.

A principal problem associated with the use of the ultraviolet emission as a means for flame detection is that the flame emits a relatively small amount of ultraviolet radiation, consequently very sensitive ultraviolet detectors are required for many applications. In addition, the magnitude of the energy emitted by the flame in the ultraviolet portion of the spectra is often much smaller than the energy present in the visible and infrared portions of the spectrum due to artificial lights and solar radiation; therefore it is necessary for the ultraviolet detector to be sensitive to ultraviolet radiation and insensitive to any ambient radiation that is present. In many cases, the detector is used in direct sunlight, and therefore the long wavelength cutoff must be below approximately 2850 A. In all applications it is desirable to have a detector response curve which has a sharp long wavelength cutoff and a high degree of sensitivity immediately below the cutoff wavelength, since the relative emission intensity of the flames decreases rapidly with decreasing wavelength.

Two commonly used ultraviolet radiation detectors are photo multiplier tubes and cold cathode gas-filled tubes. While the photo multiplier tubes are capable of extremely high sensitivity, they have the disadvantages of high cost, high voltage requirements, ease of breakage and vibrational damage, and the lack of a sharp long wavelength cutoff which results in sensitivity in the visible portion of the spectrum.

The cold cathode ultraviolet tubes are gas discharge tubes which ignite when irradiated with ultraviolet radiation. These tubes, which are presently used in furnace systems, have a high degree of sensitivity and with correct choice of cathode material, have a significant response only below 2800 A. The discharge is initiated by the photoelectric effect at the cathode of the tube, and consequently the spectral sensitivity increases slowly with decreasing wavelength. This lack of a long wavelength cutoff requires that the peak sensitivity of the tube be well below the cut-off wavelength imposed by the ambient light. The cold cathode ultraviolet tubes have the further disadvantages of ease of breakage and vibrational damage, high voltage requirements, and difficulty in obtaining reliable tubes with a response beyond 3000 A. due to damage of the cathode by ion bombardment.

Prior Art Solid State Ultraviolet Detectors

Solid state ultraviolet detectors offer a number of potential advantages including ruggedness, compatibility with integrated circuitry, small size and long life.

Despite its potential advantages, a solid state detector having response to ultraviolet radiation only and capable of sensing extremely low intensity radiation in the DC mode as well as the AC mode of operation has not heretofore been available.

In the DC mode of operation the detector responds to uninterrupted radiation from a steady state source of radiation. The signal from the detector is amplified by standard DC methods well-known in the art. The basic restriction on a detector operating in the DC mode of operation is that the dark current, in other words that current flowing through the detector when no radiation is incident upon it, must be much smaller than the photocurrent produced when radiation is incident. In the prior art it has been possible to fabricate solid state detectors which are capable of responding only to ultraviolet radiation and which are highly resistive (about $10^{11}$ to $10^{13}$ ohms) and therefore have very low dark current, However, these prior art solid state detectors have not had sufficient sensitivity to produce, in response to radiation from extremely low intensity sources such as gas pilot flames, photocurrents which are large enough to be detected when the detector is operated in the DC mode.

In the AC mode of operation, the incident radiation is periodically interrupted and the resultant periodic signal from the detector is amplified by well-known AC methods. The AC mode of operation provides increased sensitivity to extremely low intensity radiation. However, the AC mode of operation has the disadvantages of increased cost and complexity of the radiation detection system.

The fabrication of a suitable solid state ultraviolet detector is further complicated by other properties, in addition to low sensitivity which characterize large energy gap materials. First, the large energy gap materials are characterized by extremely fast free hole-electron recombination rates, which precludes in most cases any useable bulk photo-conductive effects. Second, most large energy gap materials are non-amphoteric; in other words they exist normally as only a single conductivity type, either N type or P type. Therefore, with these materials it is extremely difficult to fabricate PN junctions suitable for radiation detection.

Solid state ultraviolet detectors using silicon carbide (SiC) can be made both N and P type and consequently SiC detectors are normally made as photodiodes. However, the energy gap of SiC is only 3 electron volts, and therefore these detectors always have some sensitivity at wavelengths out to 4100 A. Therefore SiC is an unsuitable detector material for many applications, since it is sensitive to both the visible and ultraviolet portions of the spectrum. In order to isolate the ultraviolet response by the use of filters, efficient filters which transmit high energy photons and absorb low energy photons are required. Also, in many applications the amount of ambient radiation in the visible portion of the spectrum is several orders of magnitude large than the amount of ultraviolet radiation and therefore the filters must show a very large rejection for visible light. For these reasons, suitable filters for isolating the ultraviolet portions of the spectrum are extremely difficult to make.

Another solid state material which is used as an ultraviolet detector is zinc sulphide (ZnS), which has an energy gap of 3.6 electron volts, so that the cutoff wavelength of undoped material is 3400 A. However, ZnS must be activated with donor and acceptor impurities to make it photosensitive. These impurities shift the peak response of the detector to 3700 A., thereby making the cell sensitivity extend beyond 4000 A. As in the case of SiC, ZnS is not a suitable ultraviolet detector material for many applications.

Figure 2:
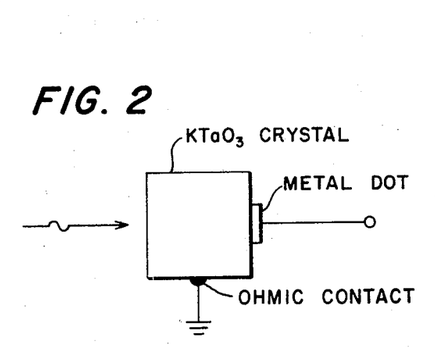
FIG. 2 shows a system for measuring the photo-response of a metal-semiconductor junction on $KTaO_3$ by illumination from the backside.

Potassium tantalate ($KTaO_3$) is a wide band gap (approximately 3.5 electron volts) extrinsic N type semiconductor with the cubic perovskite structure. The materials of the perovskite family include $KTaO_3$, lithium niobate ($LiNbO_3$), strontium titanate ($SrTiO_3$) and several other compounds having the general formula $ABO_3$. The energy gap of these materials ranges from 2.8 to 3.7 electron volts. The photoresponse of $KTaO_3$ was investigated by Wemple, Kahng and Braun in the Journal of Applied Physics, January, 1967, pages 353–359. FIG. 2 shows the system used to measure the photoresponse of the metal-semiconductor junctions formed by gold, platinum, palladium, indium, nickel and copper dots which were vacuum deposited on a freshly cleaved [100] surface of $KTaO_3$. An ohmic back contact of chromium covered by a protective overlay of gold was formed on another cleaved or etched surface. As can be seen in FIG. 2, the radiation was incident upon the "backside," that surface which was opposite the metal-semiconductor junction.

Figure 3:
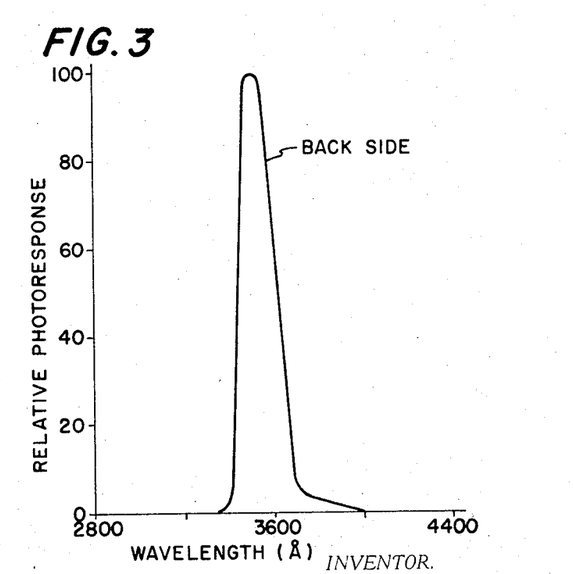
FIG. 3 shows the relative photoresponse as a function of wavelength of a metal-semiconductor junction on $KTaO_3$ which is illuminated from the backside.

FIG. 3 shows the relative photoresponse as a function of wavelength for a metal-semiconductor junction on $KTaO_3$ which is illuminated from the backside as shown in FIG. 2. The peak wavelength response occurs at 3500 angstroms. This is due to the fact that the light incident upon the detector must pass through the bulk $KTaO_3$ before reaching the metal-semiconductor junction and therefore only that part of the light whose energy is less than the energy gap reaches the metal-semiconductor junction. It is believed that this response is due to the excitation of electrons in the metal over the surface barrier. Since the barrier potential is less than the energy gap of $KTaO_3$, photoresponse to radiation in the visible portion of the spectrum is possible and the sharp long wavelength cutoff no longer exists. The response shown in FIG. 3 substantiates that the energy gap of $KTaO_3$ corresponds to a peak response of about 3400 angstroms, since only the light whose energy is less than the energy gap reaches the junction.

SUMMARY OF THE INVENTION

The present invention provides photo-conductive and photo-voltaic ultraviolet radiation detectors which are capable of sensing extremely low intensity radiation in the DC mode as well as the AC mode of operation. The peak response exhibited by the detectors of the present invention occurs at about 2600 to 2800 angstroms. The detectors comprise a body of highly resistive $KTaO_3$ having an "as-grown" surface upon which two metal contacts are attached. The "as-grown" surface is defined as the smooth outside surface of a crystal which is not modified in any way by mechanical or chemical polishing.

In the case of the photo-conductive detector, which is defined as a photodetector operating with an external bias voltage applied, the first and second contacts form essentially identical surface barrier metal-semiconductor junctions. The photo-voltaic detector, which operates with no external bias voltage applied, has two different surface barrier junctions, and in its preferred form, one of the metal contacts forms an ohmic contact with the as-grown surface.

When the as-grown surface of either the photo-conductive or the photo-voltaic detector is illuminated from the "frontside," the detector exhibits an unexpected peak response at about 2600 to 2800 angstroms. Since the energy gap of $KTaO_3$ is approximately 3.5 electron volts, the expected peak response of a detector having frontside illumination is about 3400 angstroms, which corresponds to that energy gap.

The photo-conductive detector further differs from prior art devices in the unexpected result that the photo-conductive gain, which is defined as the ratio of the number of excess charges passing between the electrodes to the number of photons absorbed in a given time interval, is greater than unity. The Schottky theory for surface barrier devices predicts that the maximum possible photo-conductive gain is unity.

DESCRIPTION OF THE PREFERRED EMBODIMENTS

KTaO$_3$ photo-conductive detector

Figure 4:
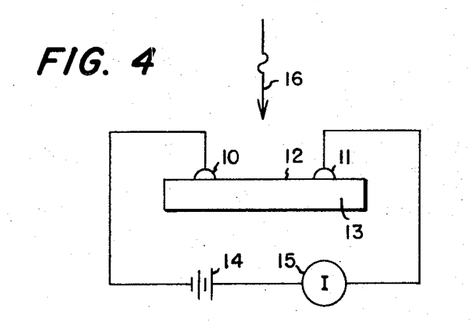
FIG. 4 shows $KTaO_3$ photo-conductive ultraviolet detectors of the present invention.

FIG. 4 shows a photo-conductive ultraviolet radiation detector in which a pair of metal contacts 10 and 11 are attached to an as-grown surface 12 of a highly resistive body of KTaO$_3$ 13, thereby forming two metal-semiconductor junctions of the surface barrier type at the interface of the contact and body. A battery 14 biases the detector and an ammeter 15 measures the current flowing through the detector. Radiation 16 is incident upon the as-grown surface 12.

Figure 4A:
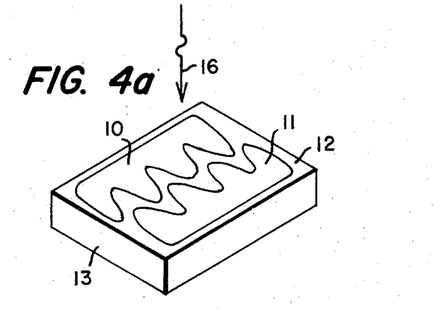

The metal contacts 10 and 11 are of the same metal and therefore cause essentially identical barrier potentials at the respective metal-semiconductor junctions. In order to form barrier potentials, the metal used for the contacts must have a work function which is different from that of KTaO$_3$. Copper, gold, gallium, silver, indium, chromium, platinum, magnesium and aluminum are examples of metals which can be used to form contacts in the present invention. The contacts can be formed by evaporation or silk screen painting of the metal onto the as-grown surface of the KTaO$_3$ body. The contacts can be in the form of closely spaced dots, or in a specific geometric pattern such as an interdigited pattern as shown in FIG. 4a. In the preferred embodiment, the contacts comprise evaporated or painted-on dots of silver.

As discussed previously, a solid state detector operating in the DC mode of operation must exhibit a photo-current which is greater than the dark current of the detector. Therefore the present invention requires an undoped or highly resistive body of KTaO$_3$ in order to have a very small dark current. Highly resistive KTaO$_3$ suitable for use in the solid state detector of the present invention has been grown at an essentially constant temperature of between about 1285° C. and about 1340° C. as measured by an uncorrected optical pyrometer. KTaO$_3$ grown at temperatures at or near 1285° C. exhibits a greater dark current. KTaO$_3$ grown at temperatures at or near 1340° C. low dark current but also exhibits a greatly reduced DC photocurrent. It has been found that KTaO$_3$ crystals grown at temperatures between about 1300° C. and about 1320° C. exhibit both excellent photosensitivity and low dark current, thereby making such crystals the preferred detector material for the present invention.

Figure 5:
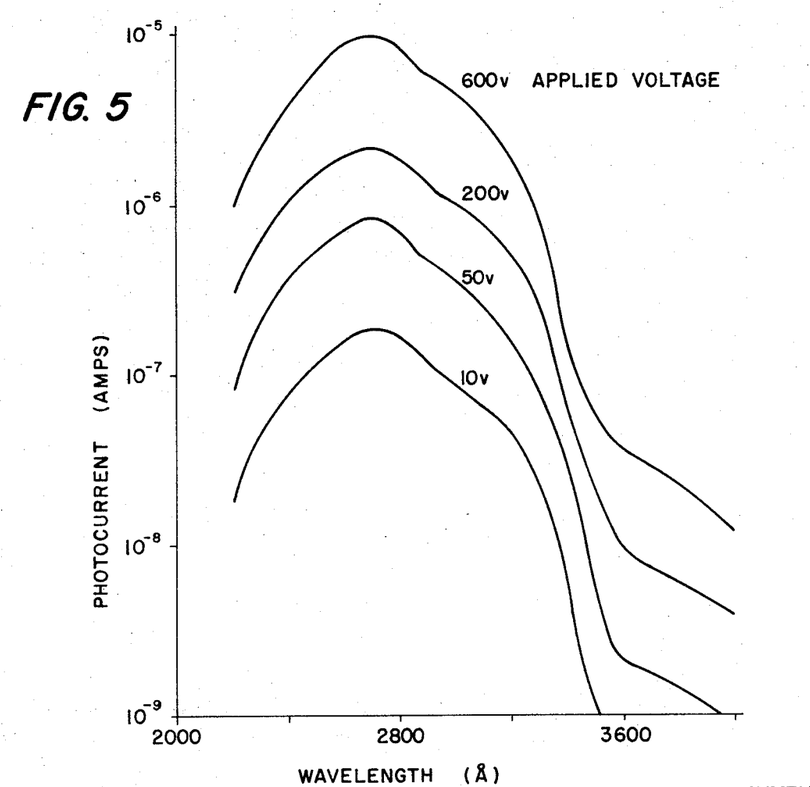
FIG. 5 shows the photocurrent as a function of wavelength of the $KTaO_3$ photo-conductive detector of the present invention for different bias voltages.

FIG. 5 shows the photocurrent of the detector shown in FIG. 4 as a function of wavelength for DC biases of 10, 50, 200 and 600 volts. The metal contacts 10 and 11 are vacuum deposited gallium contacts. It is believed that the sudden turn-on at approximately 3400 angstroms results from the onset of intrinsic excitation across the energy gap and hence is a measure of the energy gap. The photocurrent, however, continues to increase as the photon energy is increased to values greater than the energy gap. If the photocurrent were due solely to the creation of electron-hole pairs in the bulk KTaO$_3$, the photocurrent would not increase to such a large extent when the photon energy exceeds 3.5 electron volts, the energy gap of KTaO$_3$. Instead, the peak response occurs at approximately 2700 angstroms, a wave-length corresponding to a photon energy considerably larger than the energy gap of KTaO$_3$.

Figure 6:
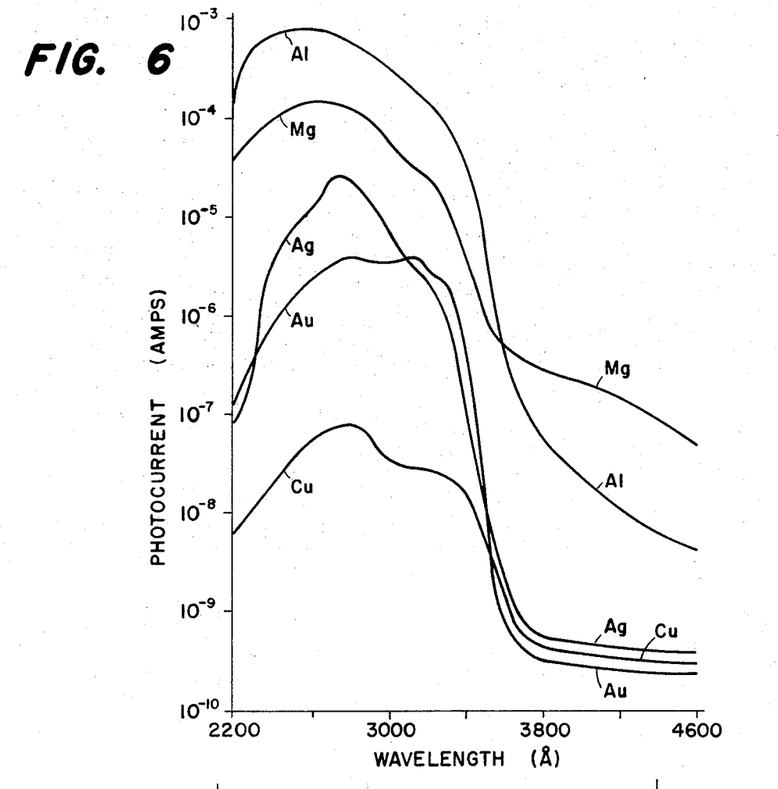
FIG. 6 shows the photocurrent as a function of wavelength of KTaO$_3$ photo-conductive detectors using various contact metals.

FIG. 6 shows the photocurrent as a function of wavelength for KTaO$_3$ detectors having contacts of copper, gold, silver, magnesium and aluminum. All detectors exhibit a peak response at about 2600 to 2800 angstroms.

In addition to the unexpected peak wavelength described above, it has been found that KTaO$_3$ photo-conductive detectors similar to that shown in FG. 4 exhibit photo-conductive gain which is greater than unity, which is the theoretical maximum photo-conductive gain predicted by the Schottky theory for surface barrier devices. The value of this gain is sometimes as high as 10$^3$. In order to appreciate the significance of this discovery, photo effects in surface barrier devices must be discussed.

When a metal and a semiconductor whose work functions are equal are brought into contact there is no transfer of charge and the conduction band in the semiconductor remains flat out to the metal-semiconductor interface. When an electric field is impressed across such a junction, current flows according to Ohm's law as $J=\sigma E$ so long as the field is low enough so that this current requirement is lower than the rate at which electrons are excited from the metal to the semiconductor due to thermionic emission. Therefore, at sufficiently low electric fields such a contact behaves ohmically and space charge neutrality exists throughout the semiconductor. Such a contact is known as an ohmic contact.

Figure 7A:
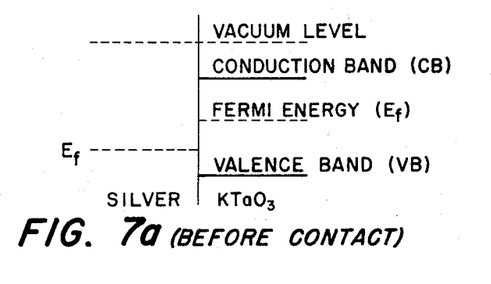
FIG. 7 schematically shows the energy levels of KTaO$_3$ and a metal such as silver before contact, at the instant contact is made, and after equilibrium has been achieved.
Figure 7B:
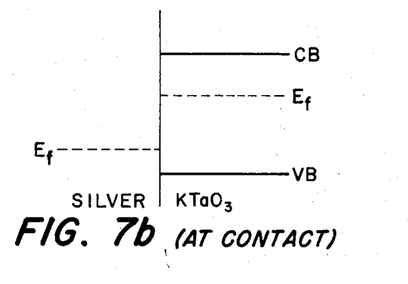
Figure 7C:
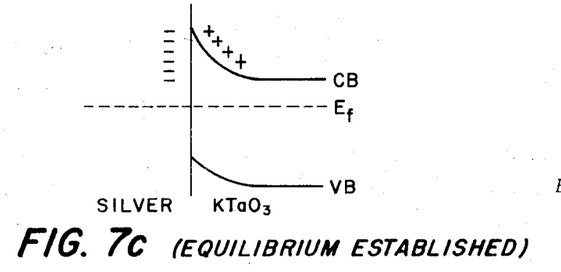

If, on the other hand, the work function of the metal is greater than that of an N type semiconductor, electrons flow from the semiconductor to the metal causing an exhaustion or depletion of majority carriers in the semiconductor near the contact. This forms a "blocking contact" or surface barrier potential at the junction and the current through the semiconductor is controlled by the junction. Except for very low voltages the current is non-ohmic. FIG. 7 shows the forming of a surface barrier junction. In FIG. 7a an N type semiconductor KTaO$_3$ and a metal such as silver are shown before contact. The instant that the silver comes in contact with the KTaO$_3$, FIG. 7b, electrons flow from the KTaO$_3$ into the metal so as to cause the Fermi energy (E$_f$) on each side of the interface to match. As the system reaches equilibrium, FIG. 7c, a barrier potential is formed at the interface which prevents further flow of electrons from the KTaO$_3$ into the metal.

The photoresponse of a surface barrier device comes primarily from two sources. The first occurs when a photon is absorbed in the metal near the metal-semiconductor interface and excites an electron over the surface barrier. This type of response can occur for photon energies less than the energy gap of the semiconductor and creates at most one photo-excited carrier per incident photon. Therefore, the maximum photo-conductive gain possible is unity. The second type of photoresponse occurs when a photon is absorbed in the strong field within the depletion layer in a reverse-biased junction and creates an electron-hole pair. The hole is swept by the field across the junction into the contact, leaving the electron free to flow in the external circuit. The barrier potential at the reverse-biased junction blocks the flow of electrons and therefore only one photo-excited carrier per photon can flow in the circuit. The maximum photo-conductive gain is therefore limited to unity.

Figure 8:
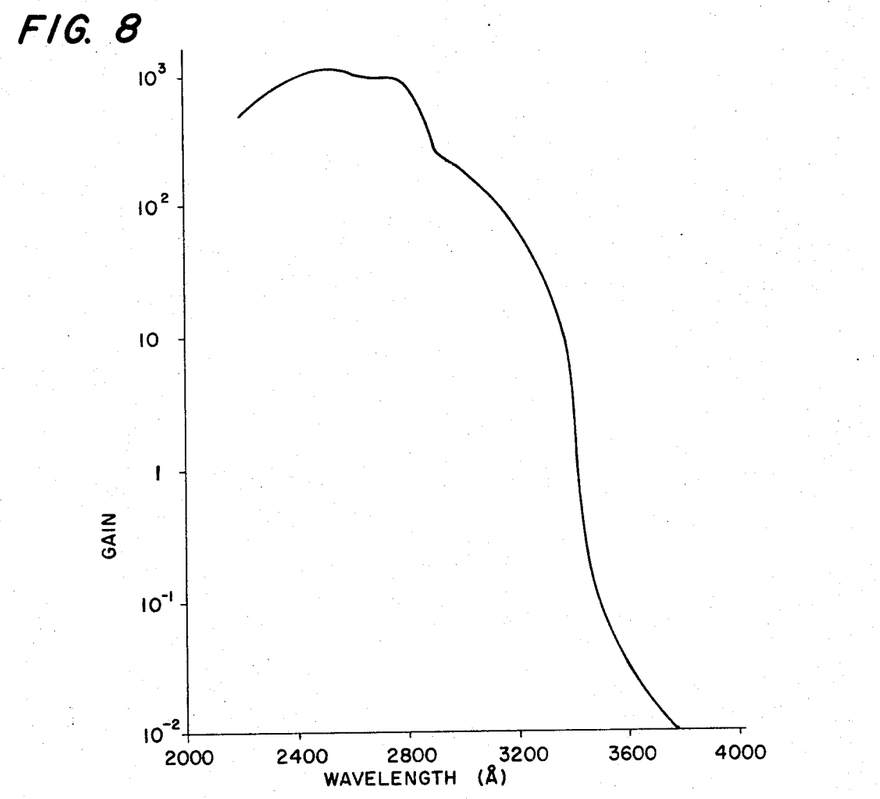
FIG. 8 shows the photo-conductive gain of KTaO$_3$ photo-conductive detector as a function of wavelength.

Referring to FIG. 8, the photo-conductive gain of a typical $KTaO_3$ detector of the present invention is shown as a function of wavelength. For wavelengths corresponding to photon energies less than the energy gap, the gain is less than unity. At 3400 angstroms, which corresponds to the energy gap of $KTaO_3$, the gain is approximately unity, as is predicted by the Schottky theory of photoresponse for surface barrier devices. However, the gain increases with decreasing wavelength and peaks at a value of approximately $10^3$. This indicates that in addition to the primary photo effects predicted by the Schottky theory, there is present a secondary photo effect which is not limited to a maximum photo-conductive gain of unity.

Figure 9:
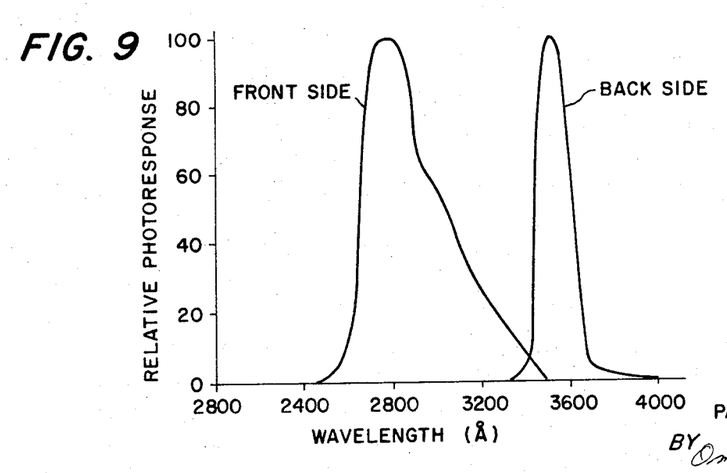
FIG. 9 compares the relative photoresponse as a function of wavelength of a KTaO$_3$ photo-conductive detector illuminated from the backside and from the frontside.

FIG. 9 compares the relative photoresponse as a function of wavelength of the same $KTaO_3$ detector with silver paint contacts which was illuminated first from the backside and then from the frontside. In addition to the different peak wavelengths, it should be noted that the photo-conductive gain mechanism present in the frontside illuminated detector is not present when the detector is illuminated from the backside. Therefore, the magnitude of the photoresponse of the frontside illuminated detector is much larger than that of the backside illuminated detector.

Figure 10:
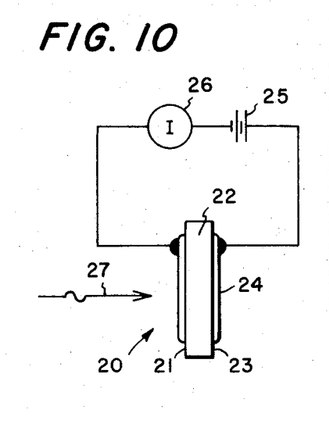
FIG. 10 shows a KTaO$_3$ device used to investigate the role which the bulk KTaO$_3$ material plays in the photodetection mechanism.
Figure 11:
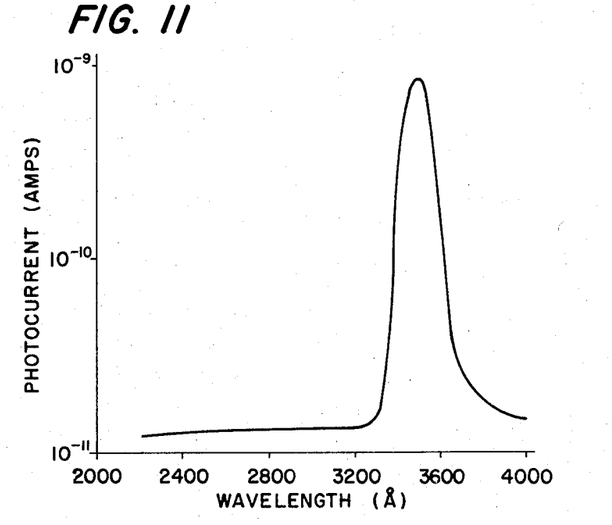
FIG. 11 shows the photocurrent as a function of wavelength of the device shown in FIG. 10.

In order to investigate the role which the bulk $KTaO_3$ material plays in the photodetection mechanism a thin (approximately 100 angstroms) silver contact 20 was evaporated on the as-grown surface 21 of a one-millimeter thick $KTaO_3$ crystal 22 shown in FIG. 10. The opposite surface 23 was lapped and polished and contacted with a thick coat of silver paint 24. A battery 25 biased the detector and an ammeter 26 measured the current flowing through the detector. The thin silver contact 20 was nearly transparent to the radiation 27 incident upon the as-grown surface. FIG. 11 shows the photocurrent of the detector of FIG. 10 as a function of wavelength. The response was much lower than the response of a detector having both contacts on the "as-grown" surface and had a sharp peak at an energy slightly less than the energy gap. Since the metal-semiconductor junction formed by the transparent contact was the same as the junctions formed by contacts on an as-grown surface, the difference in the photo-response was due to a difference in the bulk and surface properties of $KTaO_3$.

Figure 12:
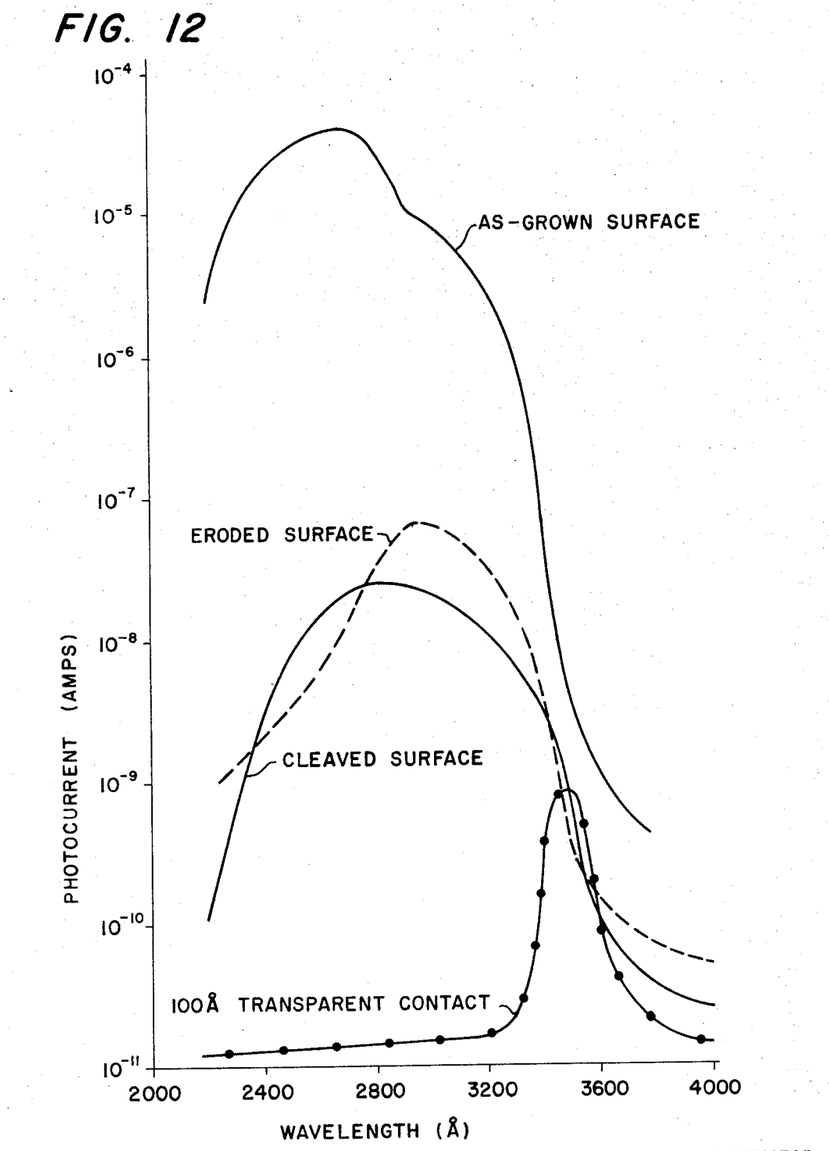
FIG. 12 compares the photocurrent as a function of wavelength of a photo-conductive device of the present invention using an as-grown surface of KTaO$_3$ with the photocurrent of a detector using a cleaved surface of KTaO$_3$, a detector using an as-grown surface of KTaO$_3$ in which the surface between the contacts has been eroded, and the device shown in FIG. 10.

The difference between the as-grown surface and the interior material of a $KTaO_3$ crystal was determined by forming two silver paint contacts side-by-side on an interior surface of a $KTaO_3$ crystal obtained by cleaving the crystal. FIG. 12 shows that the peak photocurrent of the detector using the cleaved surface was significantly lower than that of the detector fabricated with an as-grown surface. For comparison the photocurrent as a function of wavelength of the detector using the bulk properties of $KTaO_3$ as shown in FIG. 11 is superimposed upon FIG. 12.

In order to determine the depth of the layer which causes the unexpectedly large photoresponse, a detector was fabricated on an as-grown surface of $KTaO_3$ with silver contacts about four millimeters apart. Initially the photocurrent of this detector when illuminated with the broad band ultraviolet light source and biased at 100 volts was $1 \times 10^{-4}$ amps. Using a slurry of number 600 aluminum-oxide grit, a two-millimeter wide section of the as-grown surface between the contacts was eroded to a depth of 0.025 millimeter. The photocurrent, after erosion was reduced to $3 \times 10^{-7}$ amps. The depth of the erosion was gradually increased and the photocurrent was remeasured after each increase. Table I shows the results of these measurements.

TABLE I

| Depth of erosion (mm.): | Photocurrent with 100 v. bias (amps.) |
|---|---|
| 0 | $1 \times 10^{-4}$ |
| 0.025 | $3 \times 10^{-7}$ |
| 0.050 | $1 \times 10^{-7}$ |
| 0.175 | $1 \times 10^{-7}$ |
| 0.375 | $9 \times 10^{-8}$ |

The measurement of the photocurrent for various depths of erosion indicates that the photocurrent is greatly enhanced by the presence of an as-grown surface layer which is different from the interior material. Due to the large change in the photocurrent after the initial erosion and relatively small change in the photocurrent with further erosion, it appears that the depth of the layer is less than 0.025 millimeter. The photocurrent of the detector as a function of wavelength was measured when the erosion depth was 0.175 millimeter and in FIG. 12 this response is compared to the response of the cleaved and as-grown surface detectors. It should be noted that the photoresponse of the cleaved surface and eroded surface detectors is similar. The detectors are in both cases essentially two metal-semiconductor junctions connected by bulk material. The cleaved detector differs from the eroded detector in that the metal-semiconductor junctions are formed on an interior surface rather than on an as-grown surface. The similarities in response indicates that either the photocurrent is limited by the resistance of the interior surface or that the metal-semiconductor junctions formed on as-grown and interior surfaces are the same.

Although the unique photoresponse mechanism provided by the as-grown surface is not well understood, one possible phenomenological model for the photoresponse of the $KTaO_3$ detector is as follows. The metal-semiconductor junction acts as a modified surface barrier junction which is modified by the occurrence of hole traps near the junction. These hole traps become filled when ultraviolet light is absorbed by the detector, thereby forming an attractive potential near the junction which lowers the barrier potential and causes an increase in the current flow. This barrier potential lowering is a necessary condition for photo-conductive gains exceeding unity to occur. The as-grown surface allows the barrier potential lowering primarily because it allows trapping states to exist. In addition the as-grown surface appears to have a higher conductivity than the bulk material thus allowing a greater flow of photocurrent.

$KTaO_3$ photo-voltaic detector

Figure 13:
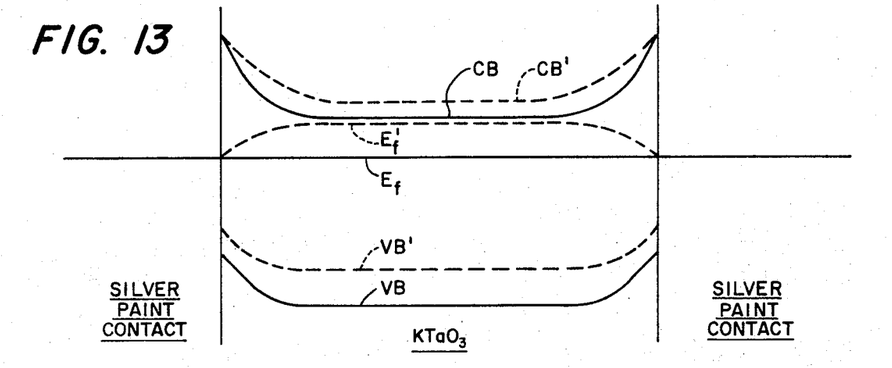
FIG. 13 shows a schematic energy diagram of a photo-conductive detector of the present invention with no external bias applied.

For many applications, and in particular for flame sensing, it is highly desirable that the solid state ultraviolet detector operate in a fail-safe mode. This mode of operation implies that the detector is entirely self-biasing, in other words photo-voltaic. The $KTaO_3$ detectors discussed previously with reference to FIG. 4 have two contacts of the same metal formed on an as-grown surface. FIG. 13 schematically shows an energy diagram of a $KTaO_3$ photo-conductive detector with no external bias voltage applied. The solid lines represent the Fermi ($E_f$), valance band (V.B.) and conduction band (C.B.) energy levels of the detector when no radiation is incident. The dotted lines represent the corresponding energy levels (represented as $E_f'$, V.B.' and C.B.') when the detector is irradiated with ultraviolet light. If the junctions are perfectly matched, the separation of charge at each junction is the same. As the charge at each junction builds up it tends to forward bias the junction, causing the barrier potential to diminish. This is shown schematically by the upward movement of the conduction band and valance band. The Fermi energy level must remain at a constant energy difference from the conduction band and therefore it also rises. The extent to which the Fermi energy level shifts under the influence of ultraviolet radiation is directly related to the magnitude of the photovoltage expected from the detector. However, with no bias applied across the two identical junctions, the barrier potential at each junction is reduced by the same amount and therefore the overall effect is zero voltage. This effect is similar to having two voltage sources of the same voltage opposing each other.

Figure 14:
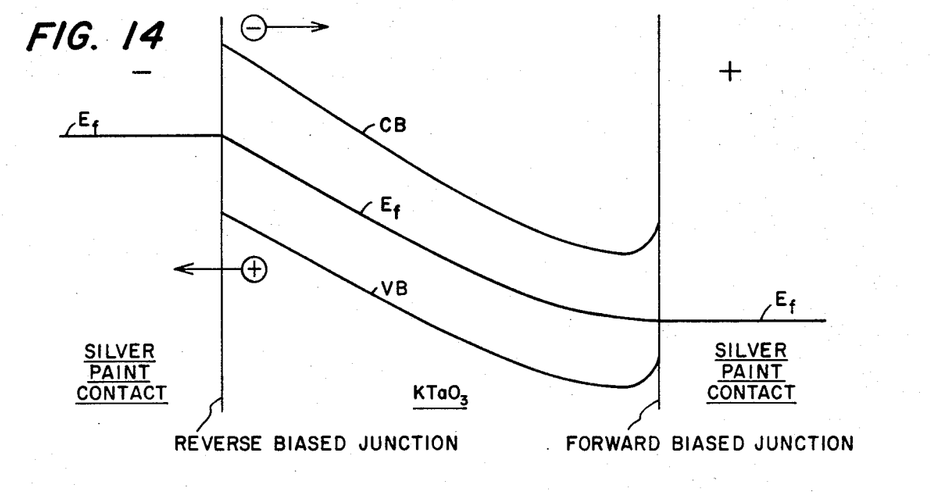
FIG. 14 shows a schematic energy diagram of a photo-conductive detector of the present invention with external bias applied.

When a bias voltage is applied to the photo-conductive detector, the schematic energy diagram is represented by FIG. 14. The forward-biased junction presents a negligible barrier potential to the flow of electrons compared to the reverse-biased junction. The forward-biased junction leakage current swamps out any photocurrents generated at the forward-biased junction. Photons which are absorbed near the reverse-biased junction, however, create hole-electron pairs which are measurable since the leakage current across the reverse-biased junction is very small. As the hole-electron pair is created, the hole is swept into the metal contact leaving the electron free to flow in the external circuit. That the reverse-biased junction is the only junction active in the photodetection process is verified by scanning the area between the contacts with a small beam of light. Photoresponse data obtained by such scanning indicates that the majority of the photoresponse comes from the area directly adjacent to the reverse-biased junction.

In view of the operation of the photo-conductive $KTaO_3$ detector it can be seen that in order to produce a photo-voltaic detector the first and second surface barrier potentials must be of different height. Like the photo-conductive detector, a photo-voltaic detector is formed by providing two contacts on an as-grown surface of $KTaO_3$. However, the contacts are formed by different metals such that the first contact forms a first metal-semiconductor junction having a large surface barrier potential while the second contact of a second metal forms a second metal-semiconductor junction having a small surface barrier potential. The second contact must be of low resistance so as not to limit the short circuit current and response time of the detector. In the preferred embodiment, the first contact is a painted-on or evaporated silver dot, while the second contact is an ohmic contact formed by an ultrasonically soldered indium rich alloy. In this embodiment, the second surface barrier potential is essentially zero.

Figure 15:
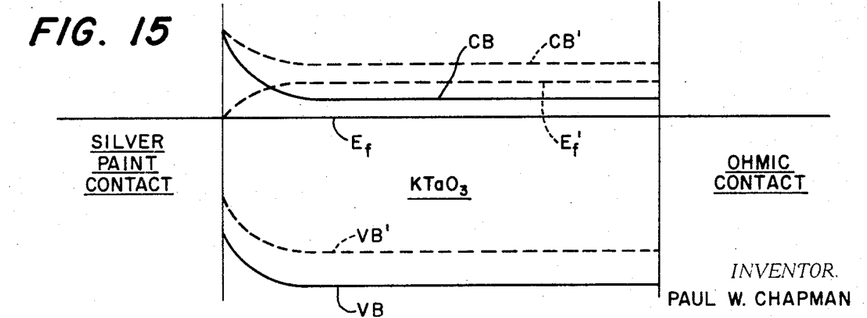
FIG. 15 shows a schematic energy diagram of a photo-voltaic KTaO$_3$ detector of the present invention.

FIG. 15 shows a schematic energy diagram for the photo-voltaic $KTaO_3$ detector to which no external bias voltage is applied. As in FIG. 13, solid lines represent the energy levels of the detector when no radiation is present and dotted lines represent energy levels of the detector when ultraviolet radiation is present. When the detector is irradiated with ultraviolet light, the charge separation at the surface barrier junction causes a change in the position of the Fermi level which is equal to the open circuit voltage. If a wire were connected between the two contacts, charge would flow through the wire so as to return the Fermi level to its original position. This current is the short circuit current of the detector.

Figure 16:
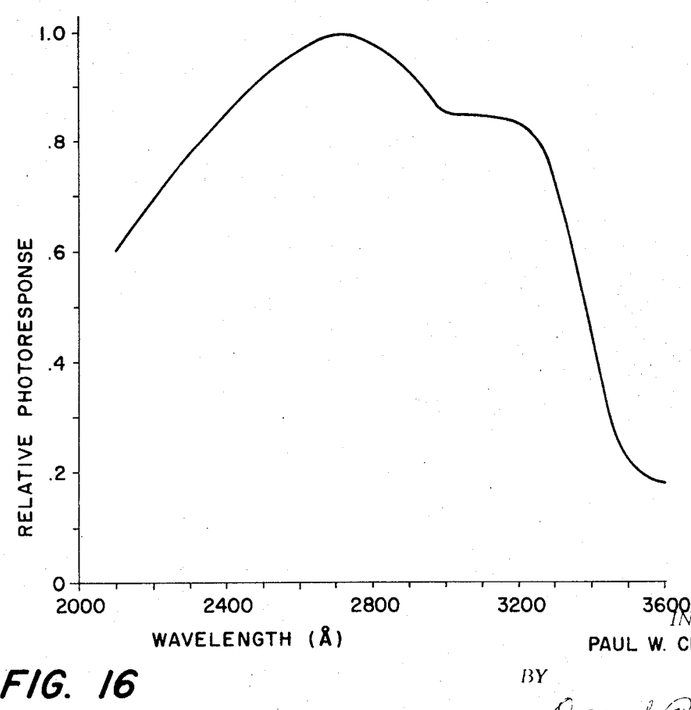
FIG. 16 shows the relative photoresponse as a function of wavelength of a photo-voltaic KTaO$_3$ detector of the present invention.

FIG. 16 shows the relative photoresponse as a function of wavelength of a photo-voltaic detector in which a silver paint contact and an ultrasonically soldered 96.5% indium, 3% antimony, 0.5% gallium contact were formed on an as-grown surface of $KTaO_3$. Radiation was incident upon the as-grown surface and no external bias was applied to the detector. As with the photo-conductive detector, the photo-voltaic detector exhibits a peak response at between 2600 and 2800 angstroms.

While this invention has been particularly shown and described with reference to the preferred embodiments thereof, it will be understood by those skilled in the art that changes in form and details may be made therein without departing from the spirit or scope of the invention.

The embodiments of the invention in which an exclusive property or right is claimed are defined as follows:

1. A solid state ultraviolet radiation detector comprising:
   a body of highly resistive potassium tantalate grown at an essentially constant temperature of between about 1285° C. and about 1340° C., and having an as-grown surface upon which ultraviolet radiation is incident, and
   first and second metal contacts attached to the as-grown surface to form first and second metal-semiconductor junctions, causing first and second barrier potentials at the respective junctions.

2. The solid state ultraviolet radiation detector of claim 1 wherein the body of highly resistive potassium tantalate is grown at an essentially constant temperature of between about 1300° C. and about 1320° C.

3. The solid state ultraviolet radiation detector of claim 1 wherein the first and second metal contacts are formed by the same metal.

4. The solid state ultraviolet radiation detector of claim 3 wherein the first and second metal contacts are formed by a metal from the group consisting of: copper, gold, gallium, silver, indium, chromium, platinum, magnesium, and aluminum.

5. The solid state ultraviolet radiation detector of claim 4 wherein the first and second metal contacts are painted-on dots of silver.

6. The solid state ultraviolet radiation detector of claim 4 wherein the first and second contacts are evaporated dots of silver.

7. The solid state ultraviolet radiation detector of claim 3 wherein first and second metal contacts form an interdigited pattern on the as-grown surface.

8. The solid state ultraviolet radiation detector of claim 1 wherein the first barrier potential is greater than the second barrier potential.

9. The solid state ultraviolet radiation detector of claim 8 wherein the second metal contact is an ohmic contact.

10. The solid state ultraviolet radiation detector of claim 9 wherein the second contact is an ultrasonically soldered indium rich alloy.

11. The solid state ultraviolet radiation detector of claim 10 wherein the indium rich alloy comprises an alloy of 96.5% indium, 3% antimony, and 0.5% gallium.

12. The solid state ultraviolet radiation detector of claim 8 wherein the first metal contact is a painted-on layer of silver.

13. The solid state ultraviolet radiation detector of claim 8 wherein the first metal contact is an evaporated layer of silver.

References Cited

UNITED STATES PATENTS

| | | | |
|---|---|---|---|
| 3,443,041 | 5/1969 | Kahng et al. | 179—121 |
| 3,420,776 | 1/1969 | Hepplewhite | 252—69 |
| 3,560,812 | 2/1971 | Hall | 317—234 |

OTHER REFERENCES

Rideout et al.: Applied Physics Letters, vol. 10, No. 11, June 1967, pp. 329–332 relied on.

JOHN W. HUCKERT, Primary Examiner

M. H. EDLOW, Assistant Examiner

U.S. Cl. X.R.

317—235 N, 235 UA, 237, 238; 250—83.3 UV, 211